WILLIAM A. RAY, INVENTOR.

BY Lyon & Lyon
ATTORNEYS

WILLIAM A. RAY,
INVENTOR.

BY Lyon & Lyon
ATTORNEYS

July 4, 1961 W. A. RAY 2,990,839
CONTROL DEVICE USING MAGNETIZABLE VIBRATORY CONDUIT
Filed Dec. 22, 1955 5 Sheets-Sheet 5
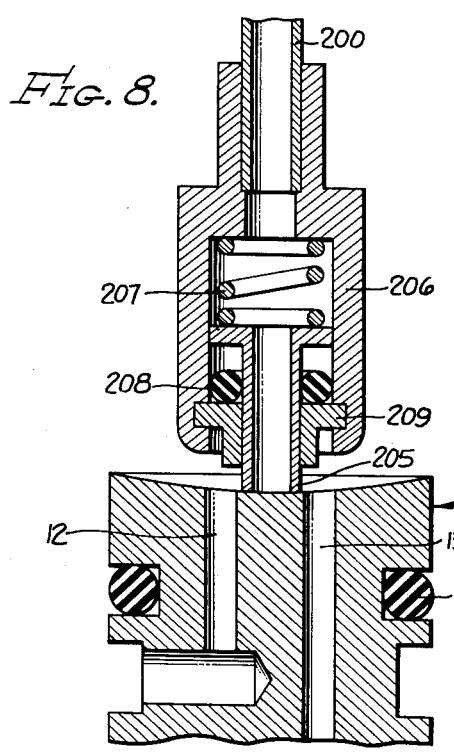
FIG. 8.
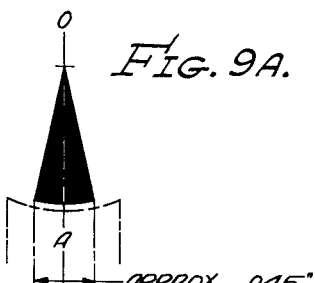
FIG. 9A.
FIG. 9B.
FIG. 9C.
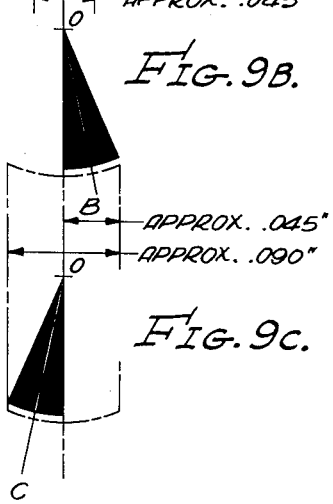
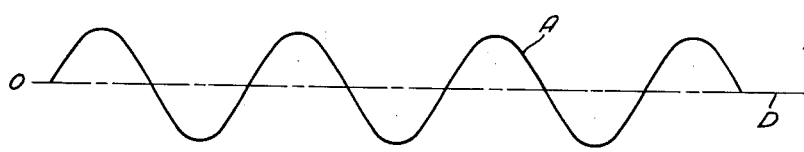
FIG. 10A.
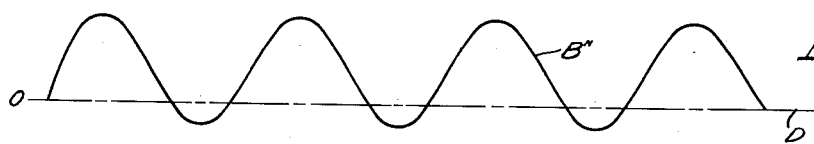
FIG. 10B.
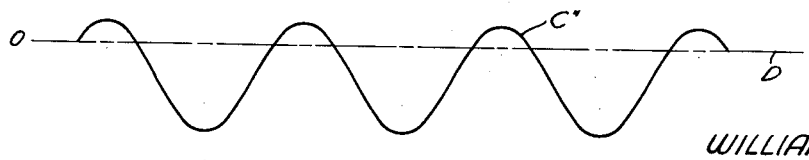
FIG. 10C.
WILLIAM A. RAY,
INVENTOR.
BY Lyon & Lyon
ATTORNEYS

United States Patent Office 2,990,839
Patented July 4, 1961

2,990,839
CONTROL DEVICE USING MAGNETIZABLE VIBRATORY CONDUIT
William A. Ray, North Hollywood, Calif., assignor to General Controls Co., Glendale, Calif., a corporation of California
Filed Dec. 22, 1955, Ser. No. 554,726
15 Claims. (Cl. 137—82)

The present invention relates to improved control means particularly useful, but not necessarily limited, to use in hydraulically-operated systems, and more specifically relates to improved control arrangements characterized by their speedy response to different operating conditions.

This application describes the invention embodied in hydraulically-operated systems incorporating fluid conduit means which is normally vibrated about a mean position at a frequency which is the same or the harmonic of a frequency of an energizing current, such mean position being variable in accordance with the amplitude of such energizing current so that such movable conduit means may be moved rapidly to different controlling positions in a relatively short period of time measured in terms of a fractional portion of the wavelength of the energizing current.

It is, therefore, an object of the present invention to provide an improved control system having and achieving the aforementioned features and results.

A specific object of the present invention is to provide an improved control means of this character which is movable to different adjusted positions to produce correspondingly different control operations, all in a relatively short period of time measured in terms of a fractional portion of the wavelength of the energizing current.

Another specific object of the present invention is to provide a hydraulically-operated control arrangement which follows extremely closely and substantially continuously control voltages or currents even though they vary rapidly.

Another specific object of the present invention is to provide an improved control of this character which is suitable in controlling the flight of a guided missile.

Another specific object of the present invention is to provide an improved control arrangement of this character which is quick and substantially continuous in its response so that there is substantially no possibility of loss of control.

The present application constitutes a continuation-in-part of my United States patent application Serial No. 231,880, filed June 15, 1951, for Hydraulic Controlling Device, now abandoned.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings, in which:

FIGURE 1A illustrates in block diagram form particular uses for the invention;

FIGURE 1B shows, in enlarged form, a portion of the structure shown in FIGURE 1;

Figure 1:
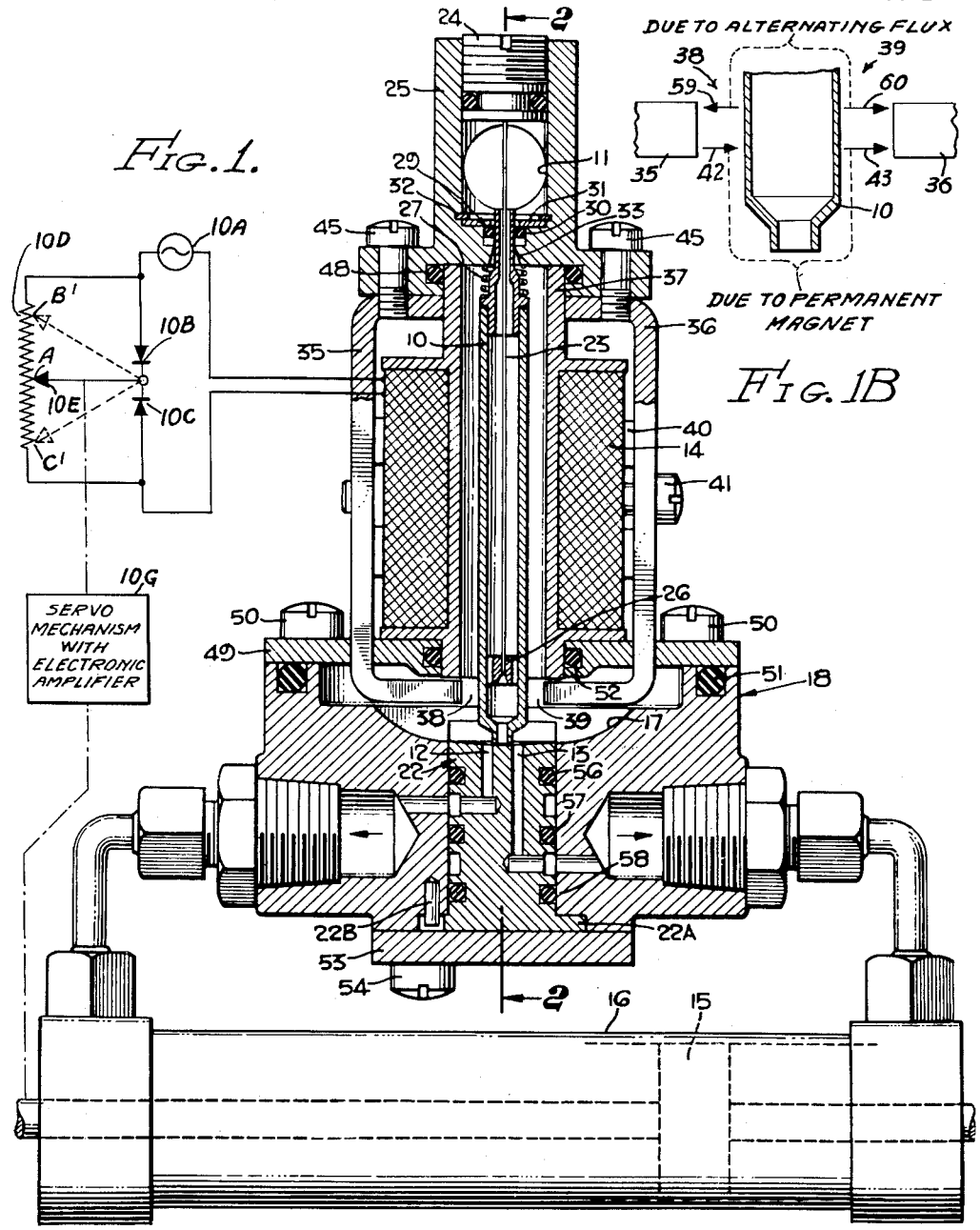
FIGURE 1 is a longitudinal sectional view through apparatus embodying features of the present invention with some of the elements connected thereto being shown in elevation, such sectional view corresponding generally to a sectional view taken substantially on the line 1—1 of FIGURE 2.
Figure 4:
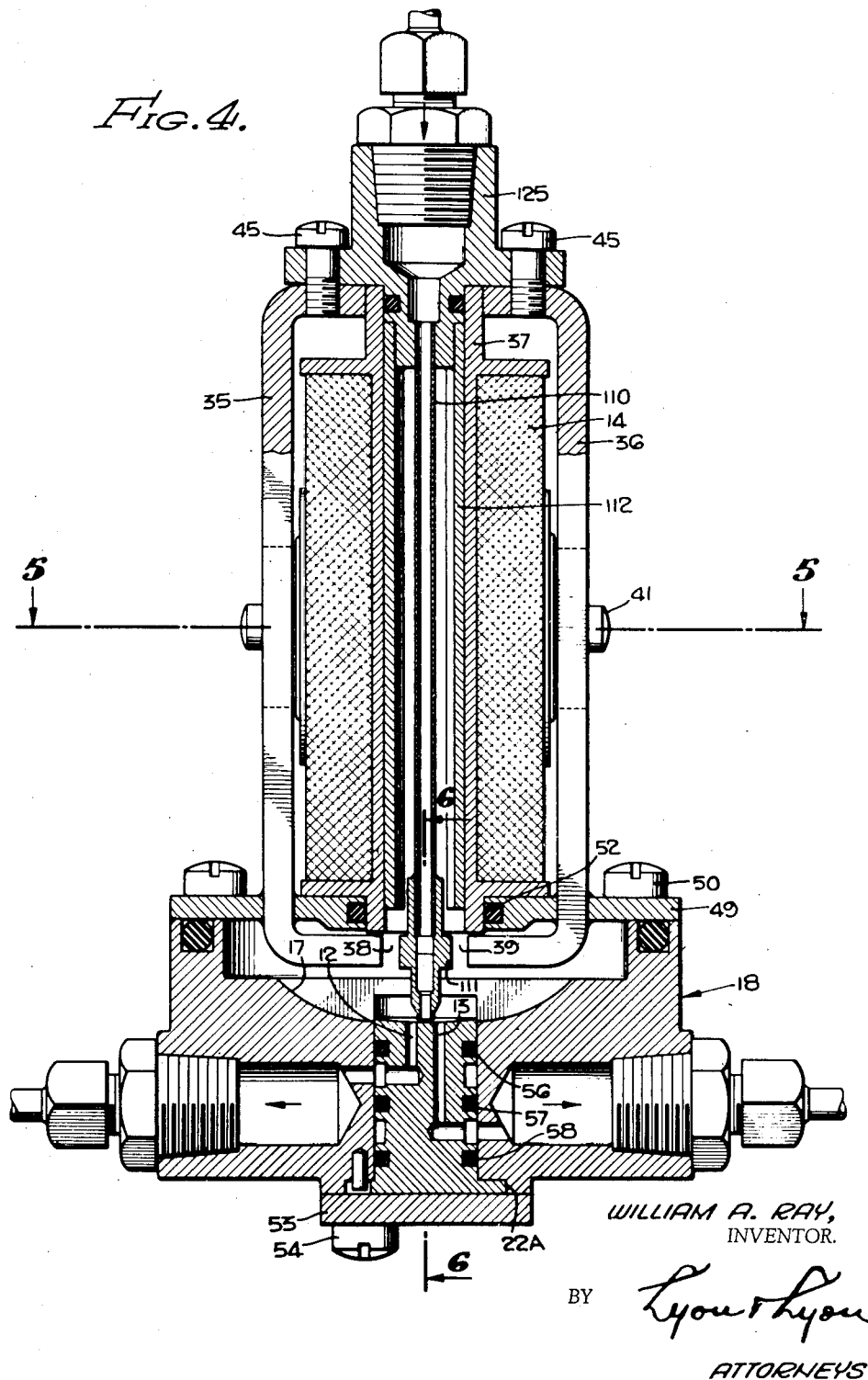
FIGURE 4 is a sectional view of a modified arrangement and corresponds generally, although not exactly, to a sectional view taken substantially on the line 4—4 of FIGURE 5, and corresponds generally to a sectional view such as shown in FIGURE 1.
Figure 5:
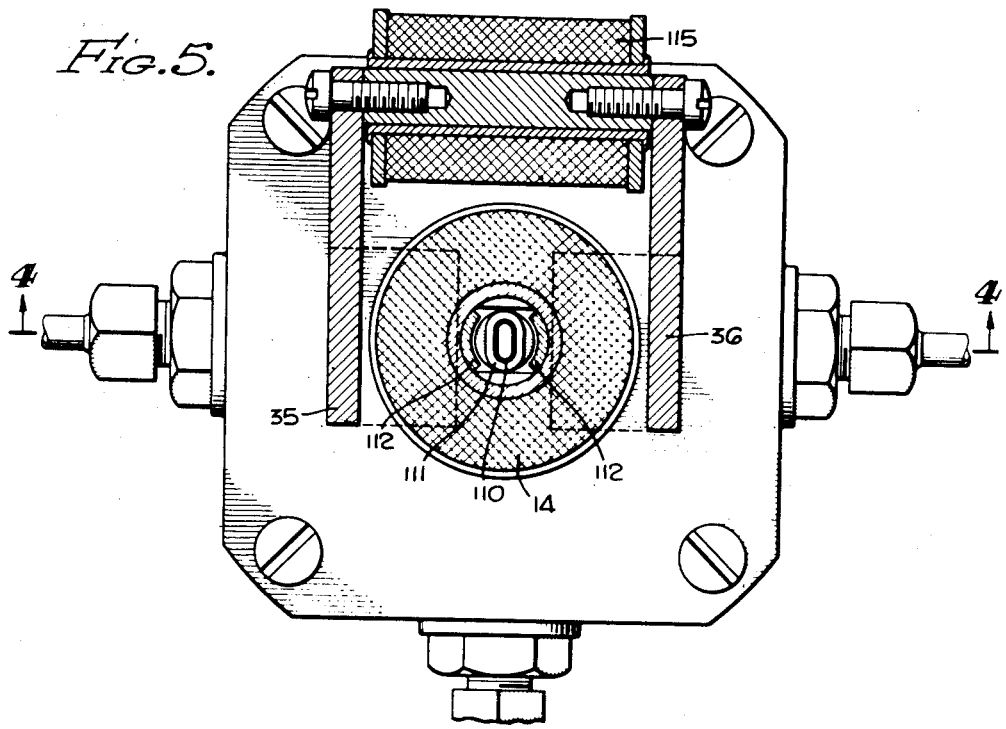
Figure 6:
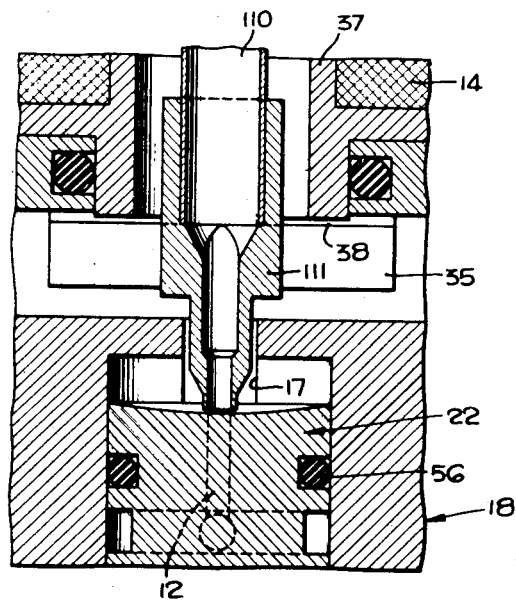
Figure 7:
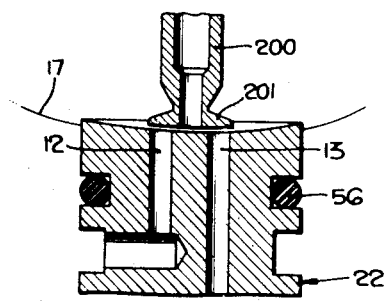

FIGURES 5 and 6 are sectional views taken substantially on the lines 5—5 and 6—6, respectively, in FIGURE 4;

FIGURE 7 shows a modified arrangement which may be substituted for either one of the arrangements shown in FIGURES 1 and 4;

FIGURE 8 shows another modified arrangement which may be incorporated in the arrangement shown in FIGURE 4;

FIGURES 9A, 9B and 9C represent graphically the character of the vibration of the conduit means disclosed herein under three different operating conditions;

FIGURES 10A, 10B and 10C represent in graphical form current flow through the energizing coil in three different operating positions.

Figure 2:
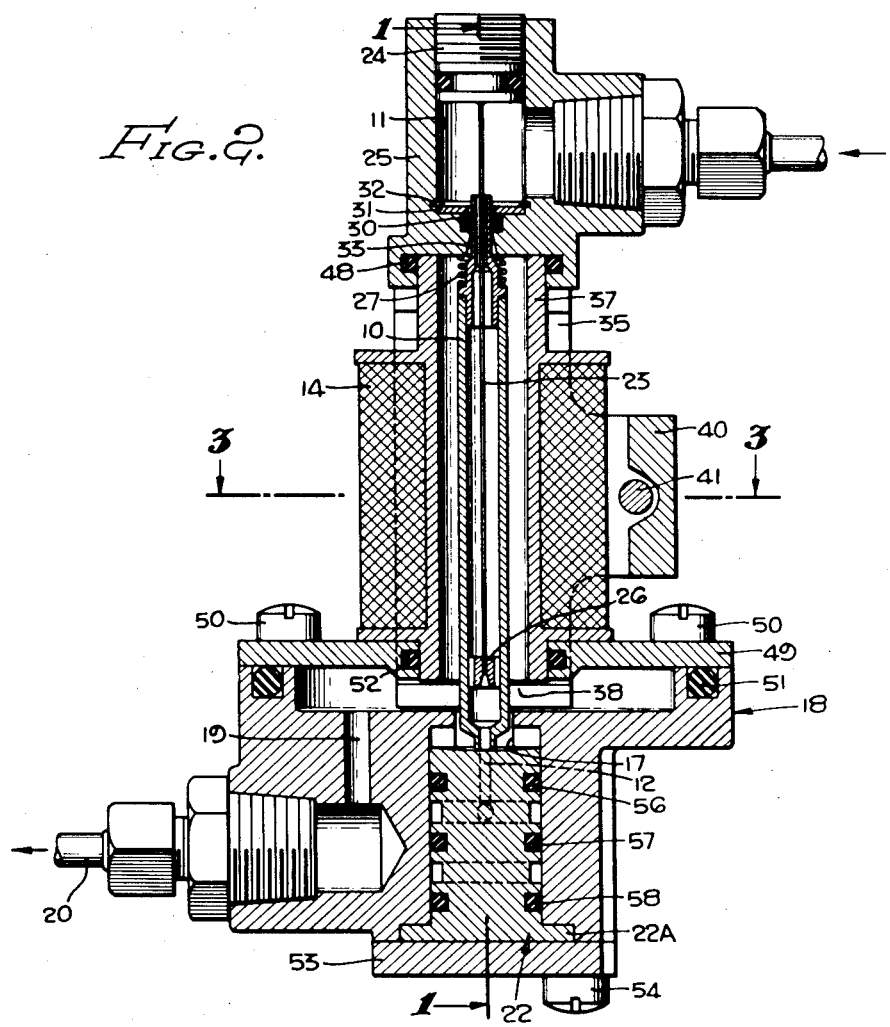
FIGURE 2 is a sectional view taken substantially on the line 2—2 of FIGURE 1.
Figure 3:
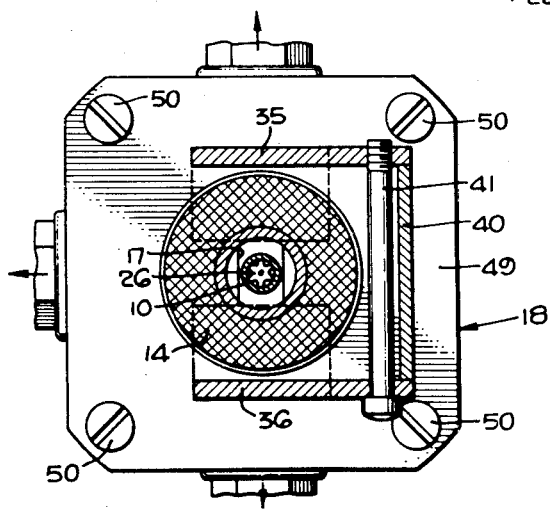
FIGURE 3 is a sectional view taken substantially on the line 3—3 of FIGURE 2.

In the arrangements shown in FIGURES 1–3, vibratory conduit means 10, in the form of a vibratory suspended tube or armature of magnetizable material is arranged to conduct high pressure operating fluid introduced and present in the conduit 11 to either one of the two ports or fluid channels 12, 13, or, in fact, to interrupt the flow of fluid to such ports or channels 12, 13, depending upon the amplitude of the current applied to the coaxially arranged solenoid winding 14.

The winding 14 is connected to a circuit as shown in FIGURE 1 which supplies both an A.C. component as well as an adjustable D.C. component to the winding 14. Briefly, when the high pressure fluid is supplied directly to the channel or port 12, the piston 15 is moved in its cylinder 16 to the right in FIGURE 1; when the high pressure fluid is introduced into the port or channel 13, the piston 15 is moved in the opposite direction, i.e., to the left; and when the vibratory conduit means or tube 10 has the mean position shown in FIGURE 1, then the supply of high pressure fluid to both ports or channels 12, 13 is interrupted and the piston 15 remains stationary.

Under the aforementioned conditions, when the piston 15 is moved to the right, the fluid to the right of piston 15 is displaced and flows upwardly through the conduit or port 13, through the dished or hollowed portion 17 of the valve casing 18, and through the conduit 19 (FIGURE 2) and associated tube 20 to a fluid reservoir or accumulator. Similarly, when under the aforementioned conditions, the piston 15 is moved to the left in FIGURE 1, the fluid to the left of the piston is displaced and flows upwardly through the conduit 12, through the hollowed portion 17 and out to the reservoir via the aforementioned conduits 19 and 20 (FIGURE 2).

The vibratory tube 10 thus cooperates with the ports 12, 13 in the valve block 22 which, as seen in FIGURE 1, has its upper surface of generally arcuate shape with a radius corresponding substantially to the effective length of the wire 23, which passes centrally through the vibratory tube 10 and supports such tube in different vertically adjusted positions, depending upon the position of the threaded plug 24 to which the upper end of the wire 23 is secured.

It is apparent that the spacing between the lower free end of tube 10 and the valve block 22 may be precisely adjusted, since the block 22, as described in detail hereinafter, is stationarily mounted within the valve casing 18 and the plug 24 is screw-threadedly received in the stationary cap or fitting 25. This spacing between the vibratory tube 10 and valve block 22 is thus adjusted that the moving free end of the tube 10 just clears but does not touch the arcuate upper surface of the valve block 22.

The vibratory tube 10 thus suspended by the wire 23, which has its lower end enlarged and closely fitting in a conical recess in the apertured spider 26, and which has its upper end fastened to the plug 24, has a resonant frequency determined to some extent by the prestressed coil spring 27, which has its lower end abutting the tubular member 10 and its upper end abutting the stationary cap 25. As a matter of fact, as is well understood, the self-vibratory or resonant frequency of the vibratory conduit means or spring mounted tube 10 is determined by its mass and the compliance of its mounting, while the amplitude of the vibrations of the tube is determined, of course, by the amplitude of the applied force as well as the friction in the vibratory system. Such friction is determined to a large extent by the frictional forces developed in the fluidtight joint 29, which comprises a leather-backed O-ring 30 disposed within a recess in the cap 25 and resiliently engaging the reduced diameter upper portion of the conduit means 10, such O-ring 30 being engaged by the retaining washer 31 which, in turn, is retained in position by the retaining ring 32 recessed in the central bore of the cap 25. It is noted that the cap 25 has the tapered opening 33 through which the conduit means 10 extends and is tapered, as shown, to provide clearance for the vibratory movement of the conduit 10.

The self-vibratory or resonant frequency of the vibratory conduit means 10 may be substantially equal to the frequency of the energizing current applied to the solenoid winding 14 or to a harmonic of such energizing current, so that vibrations of the conduit means 10 are "in phase" with the current flowing through the solenoid 14, but preferably the frequency of the energizing source is related to the mechanical resonant frequency of the conduit means 10 so that the ratio of such frequencies is not a whole number, i.e., so that the conduit means 10 may be considered to be aperiodic. In other words, preferably the mechanically supported vibratory conduit means 10 is tuned mechanically to a frequency which is different from the frequency of the current traversing the solenoid coil 14 (and different also from a subharmonic or harmonic of the mechanical resonant frequency), and such current is used to initiate and sustain oscillatory movement of the conduit means 10.

For this purpose, the magnetic flux developed by the current in coil 14 is caused to traverse a pair of symmetrically disposed C-shaped magnetizable yokes 35, 36, the upper ends of which are arcuate in form to closely fit and abut the cylindrical core or spool 37 of non-magnetizable material. The lower end of the spool 37 terminates a slight distance above the lower ends of the C-shaped magnetic yokes 35, 36. The conduit means 10, in the form of a tube of magnetizable material, passes generally centrally through the spool 37 and between the lower ends of yokes 35 and 36 to define corresponding air gaps 38, 39.

These magnetic yokes 35, 36 of magnetizable material have intermediate parts thereof contacting opposite ends of a permanent magnet 40. Such permanent magnet 40 has opposite north and south poles thereof in engagement with the magnetizable yoke members 35, 36, and is maintained in such position by, for example, transversely extending bolt 41 of non-magnetizable material, such as, for example, brass, the head of which engages the yoke 36 and the screw-threaded portion thereof engaging the threaded portion within the yoke 35.

The general purpose of this permanent magnet 40 (which alternately may comprise a core of magnetizable material encircled by a winding carrying continuous current) is to establish a predetermined continuous magnetic flux through the air gaps 38, 39, as indicated by the arrows 42 and 43 in FIGURE 1B.

It is noted that the yoke members 35, 36 are secured at their upper ends to the cap or fitting 25 by means of bolts 45, and that an O-ring 48 is interposed between a recess in the cap 25 and the spool 37 to provide a fluid-tight connection. This cap or fitting 25 is of non-magnetizable material. The lower ends of the C-shaped magnetic yokes 35, 36 pass through apertured portions of the cover member 49 of non-magnetizable material to which apertured portions of the yoke members are welded or brazed. The cap member 49 is bolted by means of bolts 50 to the valve body 18, and the circular O-ring 51 between such cover 49 and casing 18 provides a fluid-tight seal between these members.

Likewise, the O-ring 52, recessed in the cover member 49, resiliently engages the spool 37 to provide a fluid-tight connection between these elements.

The valve block 22, having the ports 12, 13 in communication respectively with opposite sides of the piston 15, is releasably maintained in the valve casing 18 by means of the bottom cover plate 53, which is affixed to the valve casing by means of bolts 54. The valve block 22 is generally cylindrical, as observed in FIGURES 1 and 2, and includes three annular recesses for three O-rings 56, 57 and 58 which serve to provide a seal between the valve block 22 and the casing. The lower end of the valve block 22 has an enlarged flanged portion 22A engageable with a suitable conforming seat in the valve casing 18, and, further, a locating pin 22B passing through the flange 22A and through an aligned aperture in the valve casing 18 accurately locates and centers the valve block 22 within the casing 18.

The coil 14 is connected to a source 10A of alternating current of, for example, 25, 60 or 400 cycles through circuitry which involves the pair of oppositely poled rectifiers 10B, 10C and the potentiometer type of resistance 10D, having its adjustable tap 10E connected to the junction point of such rectifiers 10B, 10C.

When the tap 10E is at its mid-position on resistance 10D, the condition shown in FIGURE 9A prevails; and when the tap 10E is moved in large amounts to opposite sides of such mid-position, the conditions represented respectively in FIGURES 9B and 9C prevail, which correspond likewise to conditions represented in FIGURES 10B and 10C.

The center lines OA, OB and OC in FIGURES 9A, 9B and 9C, respectively, represent the center of vibration of the conduit 10; and the shaded areas in each figure represent the range of vibration or excursion about the corresponding center lines. The lines OA, OB and OC represent positions A', B' and C', respectively, of the position of tap 10E on resistance 10D.

Thus, the line OA represents the condition wherein the center of vibration of tube 10 is midway between the ports 12 and 13 and the excursions of the conduit 10 are sufficiently large so that during certain times of such excursions the conduit 10 is aligned with the ports 12 and 13 to maintain the piston 15 in a mean position, although the piston 15 at that time is also being vibrated with, however, barely perceptible amplitude about such mean position.

When the tap 10E is moved from position A' to position B', the center of vibration of the tube is about line OB, and in such case the conduit 10, during its excursions, moves past the port 13 (without moving past port 12), so as to provide an unbalanced pressure on piston 15 to cause it to move to the left in FIGURE 1.

Likewise, when the tap 10E is moved, manually or otherwise, to position C', the center of vibration of tube 10 is about the line OC and the conduit 10 becomes aligned during its movement with port 12 (without moving passed port 13), to provide an unbalanced pressure on piston 15 to cause it to move to the right in FIGURE 1.

It is understood, of course, that the conditions mentioned above pertain to extreme movements of tap 10E and that in intermediate positions of tap 10E, the fluid from conduit 10 is distributed in unequal amounts to opposite sides of the piston 15 to cause it to move slower in shorter increments.

FIGURES 10A, 10B and 10C represent the conditions corresponding to positions A', B' and C' of tap 10E. In position A', i.e. when the tap 10E is at its mid-position, the sine wave of current A'' which comprises successive half waves of equal intensity in FIGURE 10A is symmetrical about the center horizontal axis OD, thus representing equal positive and negative portions of the alternating current wave flowing through coil 14. When the tap 10E is displaced from such mid-position to positions B' and C', the corresponding waves B'' and C'' which then comprises successive half waves of unequal intensity in FIGURES 10B and 10C are no longer symmetrical about the zero axis OD and correspondingly a greater positive and a greater negative unidirectional component of the alternating current wave flows through coil 14.

During one-half cycle of the alternating current wave, the flux produced by coil 14 may be considered to take the following paths: (1) from the lower end of conduit 10 through air gap 39, in the direction of arrow 60, up through yoke 36 and returning to the upper end of conduit 10; and (2) from the lower end of conduit 10 through air gap 38 in the direction indicated by arrow 59 up through yoke 35 and returning to the upper end of conduit 10. During the other half of the alternating current wave, the flux flows through these two paths in a direction opposite to those indicated. Theoretically, at least, no alternating current flux flows through the magnet 40, since opposite ends of the same are in engagement with points or regions of equal magneto motive force on the yokes 35, 36, due to the fact that these two yokes 35 and 36 are of substantially identical construction and are disposed symmetrically with respect to the conduit 10 and the bar magnet 40.

It will be thus observed that the yokes 35 and 36 serve to carry both alternating flux produced by coil 14 and continuous flux produced by magnet 40. The yokes 35 and 36 are preferably C-shaped so as to partially embrace the coil and provide a compact structure. It will likewise be observed that the lower ends of the yoke members 35 and 36 in FIGURE 1 are spaced closer to the magnetizable tube 10 than are the upper ends so that the air gaps 38, 39 at the lower ends are smaller than the effective air gaps at the other ends.

Assuming no current flows in coil 14 and the members 35 and 36 are polarized by the magnet 40, as indicated by the arrows 42 and 43 (which indicate the direction of flux flow due to the permanent magnet 40 alone), the left hand lower portion of tube 10 becomes a south pole which tends to be attracted to the north pole on member 35; and the right hand lower portion of tube 10 becomes a north pole which tends to be attracted to the south pole on member 36. This is in accordance with the theory that unlike magnetic poles attract each other.

These forces of attraction are balanced and the conduit 10 remains in its central position, illustrated in FIGURE 1, since the lower end thereof is acted on by equal and opposite forces.

When a current flows through coil 14 (with the tap 10E on midpoint A'), the conduit 10 vibrates due to the alternating current flux about the same mean position, since succeeding half-waves of the alternating current flowing in the coil are of equal intensity and hence of equal average value, producing equal and opposite effects during each succeeding half cycle.

This vibration of conduit 10 causes slight vibration of the piston 15 through a very small but assertable amplitude also about a mean position.

This balance is, however, destroyed when the tap 10E is displaced from its central position to, for example, positions B' or C' in which case a greater amount of magnetic flux is produced by coil 14 through one-half cycle than during the next succeeding one-half cycle. Accordingly, the conduit 10 is moved to a different mean position as indicated in FIGURES 9B and 9C, about which vibrations continue. Thus (in one of these instances), during one-half of a cycle the intensity of the magnetic pole formed at the lower end of tube 10 adjacent the air gaps 38 and 39 is of greater value than the intensity of the south pole formed at the same location during the next succeeding one-half cycle. This means that the average magnetic force developed during one-half cycle on the one hand between tube 10 and core member 36, which is polarized by magnet 40 as a south pole, is greater than the force developed on the other hand during the next succeeding half cycle between tube 10 and the core member 36, which is polarized by magnet 40 as a north pole. As a result, the mean position of tube 10 is shifted, while yet undergoing vibrations in accordance with the frequency of the source 10A. If desired, a servo mechanism or follow-up system, including an electronic amplifier, as represented by the block 10G, may serve to interconnect the piston shaft 15A with the tap 10E to automatically cause the tap 10E to be restored to its neutral position, i.e., position A'.

Thus, for example, in an automatic pilot control for aircraft, the tap 10E may be coupled to a control surface of the aircraft, and such control surface may be also coupled to conventional operating controls of the aircraft. Likewise, the arrangement may be used in other systems in which non-sluggish follow-up control is desired.

Also, for example, the valve may normally operate in the output circuit of an electronic amplifier which responds to a gyroscope or other directing device, and, in turn, the hydraulically-operated device controls the rudders or jets, etc. of a missile. Such electronic amplifier in such instance may, for example, have an output wave with a variable or adjustable unidirectional component so as to achieve the results described herein. Such an arrangement is illustrated in FIGURE 1A.

In the arrangement shown in FIGURES 4, 5 and 6, the parts which correspond with the parts in the previous figures have identical reference numerals, and the important novel features in this arrangement are considered to reside in the different manner in which the vibratory conduit means or reed is suspended. Whereas in FIGURE 1 spring means 27 are used to provide a restoring force, a flexible tube 110 is used in the arrangement shown in FIGURE 4 for the same purpose. The upper end of the flexible tube is closely fit into the apertured portion of the cap of non-magnetizable material, and the mass and elasticity of the tube 110 is such that it may vibrate at the frequency of the current supplied to the coil or to a harmonic of such frequency, although, as mentioned above, it is preferred that the tube be operated in an aperiodic manner, i.e. non-resonant manner. The lower end of the tube is fitted with a magnetic sleeve 111 adjacent the opposite poles provided by the lower ends of the C-shaped magnetic yoke members 35, 36. The solenoid spool 37 of non-magnetic material is lined with a sleeve 112 of non-magnetizable material fastened at its upper end to the downwardly extending portion of the cup 125 for purposes of increasing the cross-sectional area of such spool. It is observed that such sleeve 112 is disposed relatively close to the upper end of the sleeve 111 mounted on the lower end of the tube. As seen in FIGURE 5, the coil 115 energized with continuous current is used for the same purpose as the permanent magnet 40 in the arrangement shown in FIGURE 1.

In the modified arrangement shown in FIGURE 7, the lower end of the vibratory reed 200, which may be of the type shown either in FIGURE 1 or in FIGURE 4, is provided with an enlarged annular portion 201 adapted in one central vibratory position of the reed to close both ports 12 and 13 instead of allowing them to remain open to the space 17, as shown in the previous figures.

FIGURE 8 shows another modification which provides positive engagement between the lower end of the vibratory conduit means and the valve block 23, and while not preferred, may be found desirable under certain conditions. This arrangement comprises a small movable nozzle 205 on the lower end of the vibratory conduit 200, such nozzle being retained in the annular casing 206, a portion of which encircles and is affixed to the lower end of the conduit 200. A prestressed coil compression spring 207 has one of its ends abutting such casing 206 and the other one of its ends presses the valve element 205 always into engagement with the upper arcuate surface of the valve block 23. The lower end of the casing 206 encloses an O-ring 208, such O-ring being maintained in position by a retaining ring 209 through which the valve element 205 is allowed to slide.

In operation, the vibratory conduit in the various arrangements described may, of course, assume an infinite number of mean positions from its mid-position to an extreme position wherein the cylinder 16 is fully pressurized in one direction. In any one of such infinite positions, the conduit vibrates so as to maintain full and accurate control of the piston 15 in the cylinder 16 (even though there may be a casual loss of fluid), in response to the signal from, for example, an electronic amplifier, which signal represents the required deviation of aircraft. The hydraulic system responds practically instantaneously since the system involving the vibratory conduit is maintained in a continuous state of seeking answer to the signal. The vibratory conduit constantly vibrates in seeking a new position and this involves shifting the point of vibration.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In an arrangement of the character described, a control element vibrating about different mean positions at a unique resonant frequency, said control element incorporating first magnetic means, second magnetic means including a pair of spaced air gaps disposed adjacent said first magnetic means, means energizing said second magnetic means with a constant magneto motive force, means magnetizing said first magnetic means with an alternating magneto motive force, and means including said second magnetic means and responsive to the effective amplitude of the magnetic flux in said pair of spaced air gaps for moving said control element to different mean positions.

2. In an arrangement of the character described, a control element vibrating about different mean positions at a unique resonant frequency, said control element incorporating first magnetic means, second magnetic means including a pair of spaced air gaps disposed adjacent said first magnetic means, means energizing said second magnetic means with a constant magneto motive force, means magnetizing said first magnetic means with an alternating magneto motive force to sustain vibration of said control element, and means including said second magnetic means for moving said vibratory element to different mean positions.

3. In an arrangement of the character described, a magnetic control element, means supporting said control element for vibration near one end thereof, a non-magnetic spool encircling said vibrating control element, a pair of magnetic C-shaped yoke members partially embracing said spool and having first adjacent ends thereof spaced from the free end of said vibrating control element to thereby define a pair of air gaps disposed on opposite sides of said vibrating element, second adjacent ends of said yoke members abutting said non-magnetic spool near the point of support of said control element, a coil wound on said non-magnetic spool to sustain vibrations of said control element, a magnetic bar bridging said C-shaped members and producing a constant magnetic flux in each of said air gaps.

4. In an arrangement of the character described, a magnetic vibratory conduit vibrating as a reed about different mean positions at a unique resonant frequency, a valve member having at least one port cooperating with said conduit, means mounting said conduit for vibratory movement, said mounting means including means supporting said vibratory conduit for vibration near one end thereof, a non-magnetic sleeve encircling said conduit, a pair of magnetic C-shaped yoke members having first adjacent ends thereof spaced from the free end of said conduit and spaced from said sleeve to thereby define a pair of air gaps disposed on opposite sides of said vibratory conduit, second adjacent ends of said yoke members abutting said sleeve near the point of support of said conduit, a coil encircling said sleeve for energization with alternating current to sustain vibrations of said control element, a magnetic bar bridging said C-shaped members for producing a constant magnetic flux in each of said air gaps, and a fluid cylinder in communication with said port.

5. The arrangement set forth in claim 4 in which said mounting means includes a cap stationarily mounted with respect to said magnetic sleeve, a nut threaded in said cap, a perforated spider mounted in said vibratory conduit, a wire connected between said nut and said spider, and a prestressed coil spring between said conduit and said cap.

6. The arrangement set forth in claim 4 in which a cap is stationarily mounted with respect to said C-shaped members and said conduit means includes an inherently resilient tube fixed at one end thereof to said cap.

7. The arrangement set forth in claim 4 in which said conduit means carries a nozzle with spring means acting between said nozzle and said conduit to press said nozzle into engagement with said valve member.

8. The arrangement set forth in claim 4 in which said valve member has two spaced ports with the conduit having means thereon for simultaneously closing off both of said ports.

9. The arrangement set forth in claim 4 in which said magnetic bar comprises a permanent magnet.

10. The arrangement set forth in claim 4 in which said magnetic bar is energized with flux produced by a coil through which a substantially constant current flows.

11. In an arrangement of the character described, a magnetic structure having a pair of air gaps, said structure incorporating a source of magneto motive force for producing flux in said air gaps, an energizing coil associated with said structure for magnetizing said structure in accordance with alternations of an alternating current applied thereto, and means including said coil for alternately changing the intensity of said flux in corresponding ones of said air gaps in accordance with alternations of said current.

12. In an arrangement of the character described, a magnetic structure, a coil associated with said structure for magnetizing said structure in accordance with alternations of a current applied to said coil, a vibratory element, said structure having a pair of spaced poles between which said element vibrates, and means including said coil for alternately changing the strength of corresponding ones of said spaced poles in disproportionate amounts.

13. In an arrangement of the character described, a magnetic structure having a pair of spaced poles, a coil associated with said structure for magnetizing the same with alternating flux in accordance with altrenations of an alternating current applied thereto, an element vibrating in rhythm with said alternating flux between said pair of poles, said structure incorporating a source of unidirectional flux through said pair of poles, and means for controlling the relative intensity of successive half cycles of said alternating flux.

14. An arrangement as set forth in claim 12 in which the alternations of said current are in resonant relationship with respect to the resonant frequency of the vibratory element.

15. An arrangement as set forth in claim 12 in which said alternations of current are in aperiodic or non-resonant relationship with respect to the resonant frequency of said vibratory element.

References Cited in the file of this patent

UNITED STATES PATENTS

| | | |
|---|---|---|
| 1,959,889 | Wunsch | May 22, 1934 |
| 2,057,605 | Blosser | Nov. 13, 1936 |
| 2,149,126 | Spencer | Feb. 28, 1939 |
| 2,269,072 | Wilde et al. | Jan. 6, 1942 |
| 2,310,185 | Weyandt | Feb. 2, 1943 |
| 2,532,723 | Knoop | Dec. 5, 1950 |
| 2,579,723 | Best | Dec. 25, 1951 |
| 2,655,940 | Jackson | Oct. 20, 1953 |
| 2,699,356 | Ziebolz | Jan. 11, 1955 |
| 2,729,751 | Westman | Jan. 3, 1956 |
| 2,816,976 | Carpenter | Dec. 17, 1957 |
| 2,830,152 | Tasher | Apr. 8, 1958 |

FOREIGN PATENTS

| | | |
|---|---|---|
| 874,370 | France | Aug. 5, 1942 |